United States Patent

Magyar

[15] 3,635,525
[45] Jan. 18, 1972

[54] VEHICLE SEAT HAVING AN ADJUSTABLE BACK

[72] Inventor: Joseph J. Magyar, Warren, Mich.
[73] Assignee: General Motors Corporation, Detroit, Mich.
[22] Filed: Aug. 25, 1969
[21] Appl. No.: 852,595

[52] U.S. Cl. .............................297/354, 297/364, 297/374, 297/379
[51] Int. Cl. .........................................A47c 3/00, B60n 1/02
[58] Field of Search ...............................297/353–354, 355, 297/374, 378, 379, 313, 363, 364

[56] References Cited

UNITED STATES PATENTS

| | | | |
|---|---|---|---|
| 3,241,408 | 3/1966 | McCauley | 85/32 R |
| 3,286,971 | 11/1966 | Walter et al. | 297/363 X |
| 3,410,600 | 11/1968 | Thorpe | 297/379 X |
| 3,419,307 | 12/1968 | Strobush | 297/379 |
| 3,481,646 | 12/1969 | Tabor | 297/364 X |
| 3,441,313 | 4/1969 | Persson | 297/374 |

Primary Examiner—Paul R. Gilliam
Attorney—J. L. Carpenter and E. J. Biskup

[57] ABSTRACT

A seat assembly for a vehicle including a seat cushion frame and a seat back frame, the latter of which is supported for selective pivotal movement relative to the seat cushion frame about first and second transverse axes which lie in an inclined plane passing through the seat cushion frame and intersect at a point located adjacent to the longitudinal center axis of the vehicle.

7 Claims, 8 Drawing Figures

PATENTED JAN 18 1972

INVENTOR.
Joseph J. Magyar
BY
E. J. Biskup
ATTORNEY

INVENTOR.
Joseph J. Magyar
BY
E. J. Biskup
ATTORNEY

INVENTOR
Joseph J. Magyar
BY
E. J. Biskup
ATTORNEY

VEHICLE SEAT HAVING AN ADJUSTABLE BACK

This invention concerns a vehicle seat assembly having a seat back frame that can be folded forwardly from a normal upright position and can be angularly adjusted relative to the seat cushion frame so as to provide a plurality of upright positions for the seat occupant.

Seat constructions of the type that the instant invention is directed to are usually located in the forward portion of the passenger compartment of a two-door automobile and, accordingly, require a foldable seat back to permit egress and ingress of the rear passengers. In one form of the seat, the seat back frame is connected to the seat cushion frame for forward pivotal movement about a transverse axis which is inclined relative to the longitudinal axis of the vehicle so that the outboard upper corner of the seat back moves forwardly and inwardly as the seat back is moved to the folded position. The path of travel of the seat back frame about the inclined axis provides increased clearance for the shoulder area of the passenger when entering or leaving the rear of the vehicle.

The present invention contemplates a seat assembly of the above-described type which in addition to having the seat back movable to the forward folded position over the seat cushion can also be adjusted forwardly or rearwardly when in the upright position to provide a more comfortable backrest position for the seat occupant. In the preferred form, the seat assembly made according to the invention has the seat back frame connected to the seat cushion frame by three pivotal connections, all of which are located in an inclined plane which passes through the seat cushion frame. Two of the pivotal connections are located adjacent to the outboard side of the seat cushion frame, while the third pivotal connection is situated at the inboard side of the seat back frame so that a pair of lines passing through the centers of the outboard pivotal connections and the inboard pivotal connection define intersecting pivot axes about which the seat back frame is selectively movable. More specifically, the seat back frame has the side edges thereof formed with rigid hinge arms, one of which is connected by the inboard pivotal connection to the seat cushion frame, while the other is combined with a manually operated positioning device which serves as one of the outboard pivotal connections and also permits the associated hinge arm to be moved upwardly or downwardly with resultant angular movement of the seat back frame about one of the pivot axes to a desired upright position. The other of the outboard pivotal connections comprises a third hinge arm interposed between the aforementioned hinge arms and supported for pivotal movement on the seat back frame in a manner which enables it to normally latch onto a portion of the seat cushion frame and be manually movable relative to the seat back frame to an unlatched position to permit movement of the seat back frame about the other transverse pivot axis. During the latter movement, the seat back frame is movable forwardly into the folding position as explained above.

The objects of the present invention are to provide a vehicle seat construction having a seat back which can be moved from an upright position to a forward folded position over the seat cushion and can be selectively adjusted when in the upright position to provide a comfortable backrest for the seat occupant; to provide a three-point pivotal suspension for a seat back frame wherein two of the pivotal points are laterally spaced from each other and are fixed in spacial relationship while the third pivotal point is movable so as to provide angular adjustment of the seat back frame about a transverse axis passing through the two fixed pivotal points; to provide a seat assembly which can be selectively moved about two transverse axes which intersect at the inboard side of the seat back and in which the seat back is supported by hinge arms having pivot points located along the transverse axes and combined with a positioning device which permits angular movement of the seat back when in the upright position and also a latch device which serves to hold the seat back in a fixed upright position and is releasable to permit the seat back to be folded forwardly over the seat cushion about the other of the transverse axes, and to provide a vehicle seat assembly having a seat cushion and a seat back which is normally held in a fixed position relative to the seat cushion and is adjustable either forwardly or rearwardly about a transverse axis through a predetermined range.

Other objects and advantages of the present invention will become more apparent from the following detailed description when taken with the drawings wherein.

Figure 1:
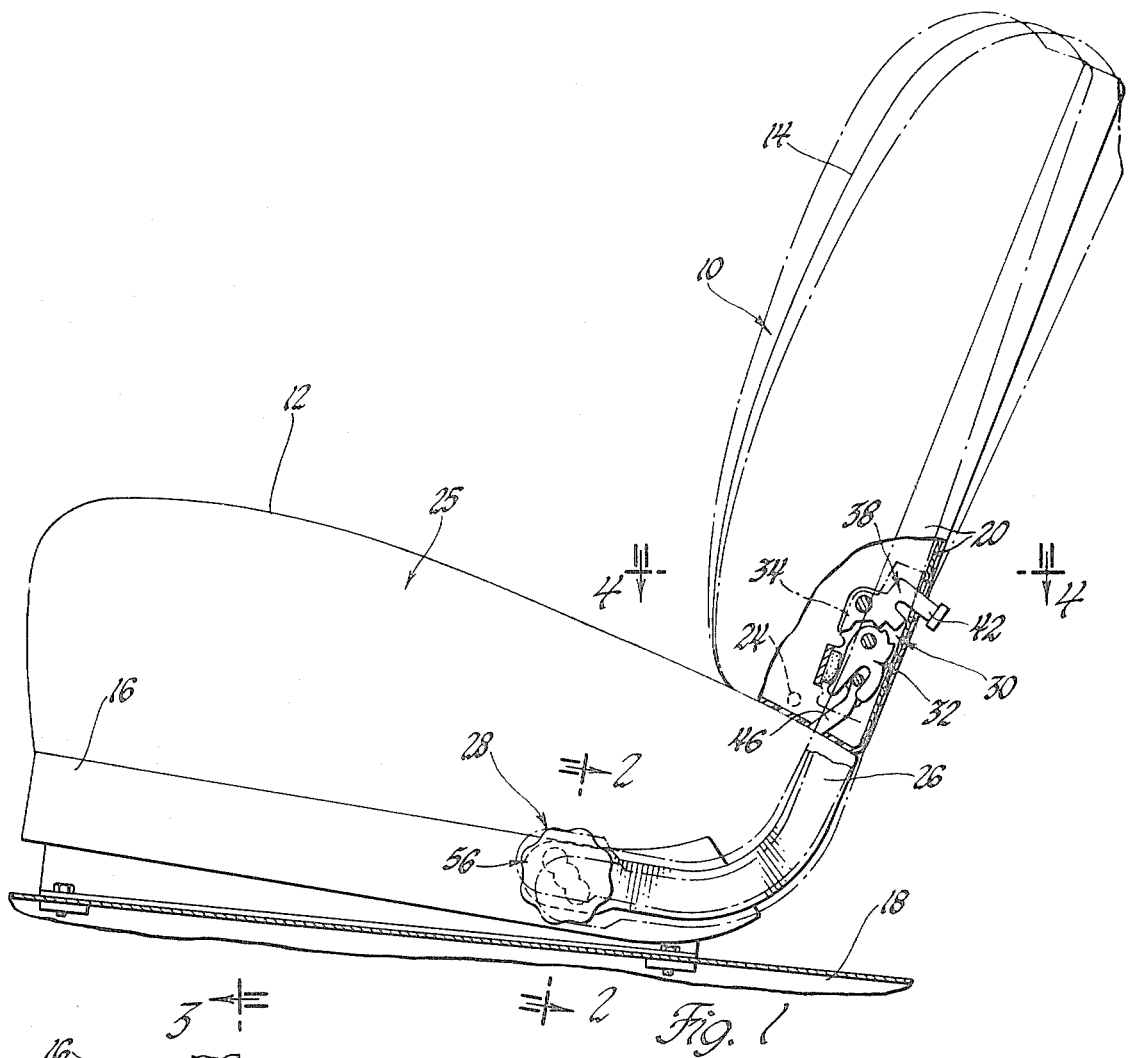
FIG. 1 is an elevational view of a vehicle seat assembly made in accordance with the invention.
Figure 4:
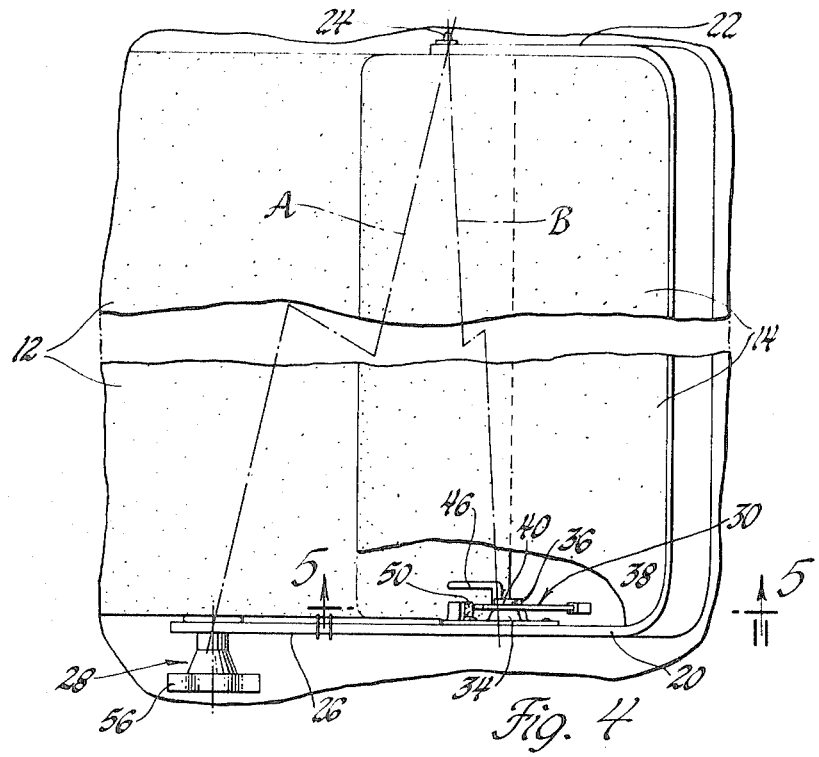
FIG. 4 is a plan view of the vehicle seat assembly taken on line 4—4 of FIG. 1.

Referring to the drawings and more particularly FIGS. 1 and 4 thereof, a vehicle seat assembly 10 is shown comprising the usual seat cushion 12 and a seat back cushion 14. The seat cushion 12 is carried by a seat cushion frame 16 which in turn is rigidly bolted to a vehicle floor 18. An upstanding seat back frame 20 carries the seat back cushion 14 and has the inboard side thereof formed with a downwardly depending and forwardly extending hinge arm 22 which is connected by a pivot pin 24 to the seat cushion frame 16. The outboard side of the seat back frame 20 rigidly supports a downwardly depending L-shaped hinge arm 26 which terminates alongside and intermediate the forward and rearward ends of the seat cushion frame 16 and is connected thereto through a positioning device 28 which together with pivot pin 24 defines a transverse axis "A" about which the seat back frame 20 is foldable forwardly as will be described more fully hereinafter. As seen in FIG. 4, located between the hinge arms 22 and 26 and also carried by the seat back frame 20 is a latch device 30 which when in the locked position prevents the seat back frame 20 from being folded forwardly over the seat cushion 12 about the axis "A." When in the locked position, a portion of the latch device 30 serves as a hinge so that upon release of the positioning device 28, the seat back frame 20 can be adjusted forwardly or rearwardly of the full line normal position seen in FIG. 1 about a transverse "B" which passes through a pivotal connection provided by the latch device 30 and the pivot pin 24 supporting the hinge arm 22.

Figure 5:
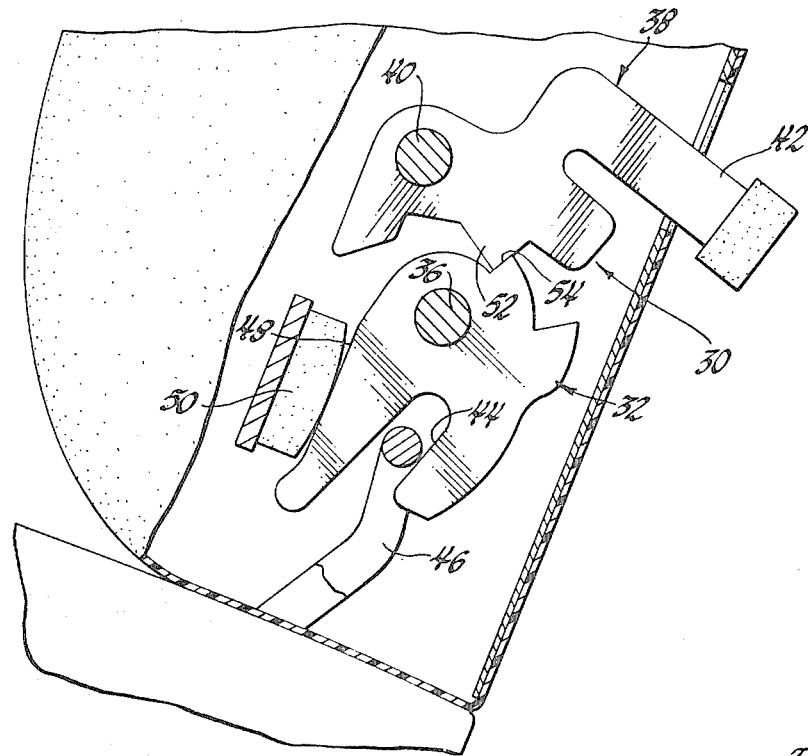
FIG. 5 is an enlarged view showing the details of a latch device taken on line 5—5 of FIG. 4.

More specifically, and as seen in FIG. 5, the latch device 30 incorporated with the seat back frame 20 comprises a hinge arm or swinging bolt 32 which is normally biased by a spring (not shown) in a counterclockwise direction and is supported on a base 34 for pivoting movement by a pivotal connection 36. Located above the bolt 32 is a release member 38, one end of which is connected by a pivotal connection 40 to the base 34, while the other end is formed with a handle 42 which can be manually raised against the bias of a spring (not shown) to release the bolt 32. In this regard, it will be noted that the bolt 32 has an elongated notch 44 formed therein which accommodates a U-shaped striker 46 secured to the rear end of the seat cushion frame 16. When the latch device 30 is in the locked condition, a forwardly located surface 48 formed with the bolt 32 engages a stop member 50 rigidly secured to the seat back frame 20. At such time, a pointed tab 52 formed with the release member 38 is located in the path of a raised shoulder 54 formed on the bolt 32 so that the latter is incapable of rotating under the influence of a spring (not shown) in a counterclockwise direction. It should be noted that the striker 46 together with the bolt 32 constitute the pivotal connection referred to above between the seat back frame 20 and the seat cushion frame 16. Thus, when the hinge arm 26 is released by the positioning device 28 as will be described hereinafter, the seat back frame 20 can be adjusted in position about the transverse axis "B" passing through the striker 46 of the latch device 30 and the pivot pin 24 located on the outboard side of the vehicle seat assembly 10.

Figure 2:
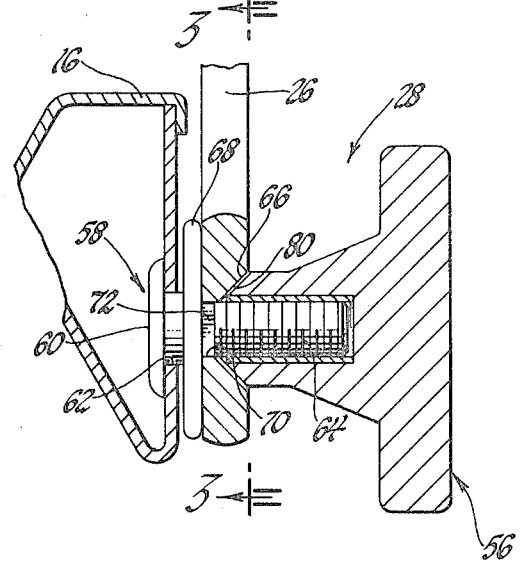
FIG. 2 is an enlarged sectional view taken on line 2—2 of FIG. 1 showing a positioning device incorporated with the vehicle seat.
Figure 3:
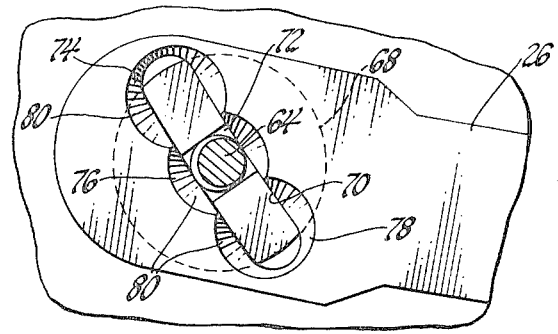
FIG. 3 is a view taken on line 3—3 of FIG. 2.

As seen in FIGS. 2 and 3, the positioning device 28 pivotally supports the hinge arm 26 and comprises a manually operable knob 56 and a pivot member 58, the head end 60 of which is rotatably mounted in a circular aperture 62 formed in the outboard side of the seat cushion frame 16. The outer end of the pivot member 58 is integrally formed with a threaded stud 64, the longitudinal center axis of which is coaxially aligned with the center of the aperture 62. The knob 56 is threadably mounted on the stud 64 and includes a tapered end portion 66 which is adapted to press the hinge arm 26 firmly in contact with a disc-shaped bearing member 68 integrally formed with the pivot member 58. In this connection, it will be noted that the hinge arm 26 is formed with an elongated arcuate slot 70 which receives a square-shaped guide member 72 which is integral with the stud 64. Thus, under conditions to be explained, the hinge arm 26 can be moved relative to the pivot member 58 along the longitudinal axis of the slot 70. As best seen in FIG. 3, the longitudinal axis of the slot 70 is inclined forwardly and has an imaginary center located at a point along the axis "B."

By moving the hinge arm 26 either upwardly or downwardly relative to the stud 64, the seat back frame 20 can be positioned about the axis "B" either forwardly or rearwardly. In this connection, it will be noted that the outside of the hinge arm 26 has three circular well portions 74, 76, and 78 uniformly spaced along the slot 70 with each well portion having an inner conical surface 80 complementary to the tapered end 66 of the knob 56. Each of the well portions 74, 76, and 78 provide an angular position for the seat back frame 20. For example, as seen in FIGS. 1 and 3, the tapered end 66 of the knob 56 is located within the well portion 76 so that the back cushion 14 is in the normal seating position as seen in full lines in FIG. 1. When it is desired to place the back cushion 14 in a forward position, the knob 56 is manually rotated in a direction to unscrew it from contact with the hinge arm 26 so as to remove the force urging the hinge arm 26 into frictional contact with the bearing member 68. Thereafter, the hinge arm 26 can be shifted downwardly so as to position the well portion 74 approximately centrally with respect to the stud 64. The knob 56 is then rotated in the opposite direction so as to seat the tapered end 66 thereof in the well portion 74 and frictionally fix the hinge arm 26 against the bearing member 68. Similarly, if it is desired to move the back cushion 14 to a reclinging position relative to the full line position seen in FIG. 1, the hinge arm 26 is raised upwardly so as to locate well portion 78 substantially centrally relative to the stud 64. Thereafter, the knob 56 is once again tightened against the hinge arm 26 until its tapered end 66 seats in the well portion 78 and secures the hinge arm 26 to the bearing member 68.

It should be apparent from the above description that when the latch device 30 is in the locked condition and the positioning device 28 is maintaining the hinge arm 26 in a fixed position relative to the pivot member 58 as seen in FIG. 3, the seat back frame 20 is locked to the seat cushion frame 16 and cannot be moved relative thereto about either of the axes "A" or "B." However, when the release member 38 is raised so as to remove the tab 52 out of the path of the shoulder 54 formed on the bolt 32, the seat back frame 20 can be folded forwardly about the axis "A" and thereby provide access space for passengers entering the rear of the automobile. When the seat back frame 20 is returned to its normal upright position, the bolt 32 will automatically be cammed onto the striker 46 and lock the seat back frame 20 in position once again.

Figure 6:
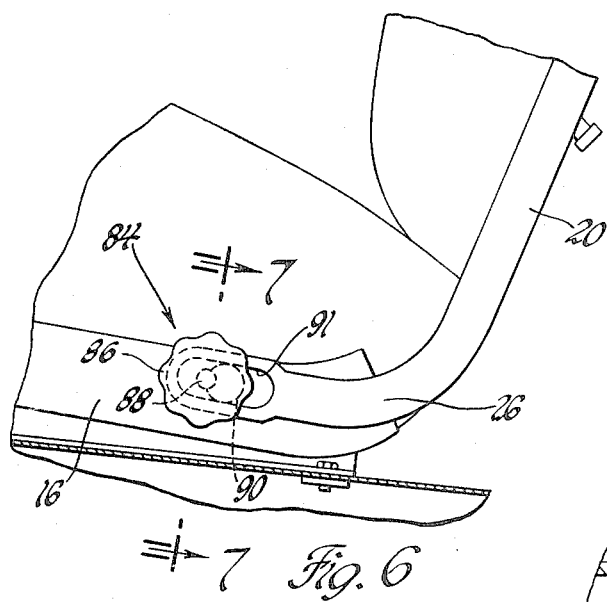
FIG. 6 shows a modified form of the positioning device which can be incorporated with the vehicle seat of FIG. 1.
Figure 7:
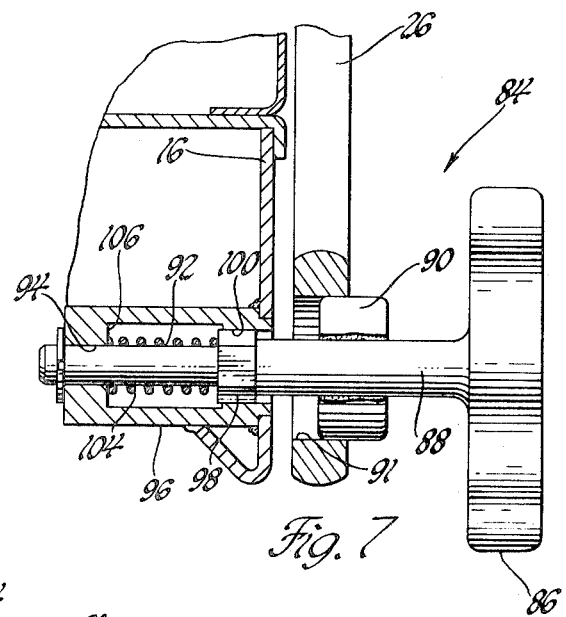
FIG. 7 is an enlarged sectional view taken on line 7—7 of FIG. 6.
Figure 8:
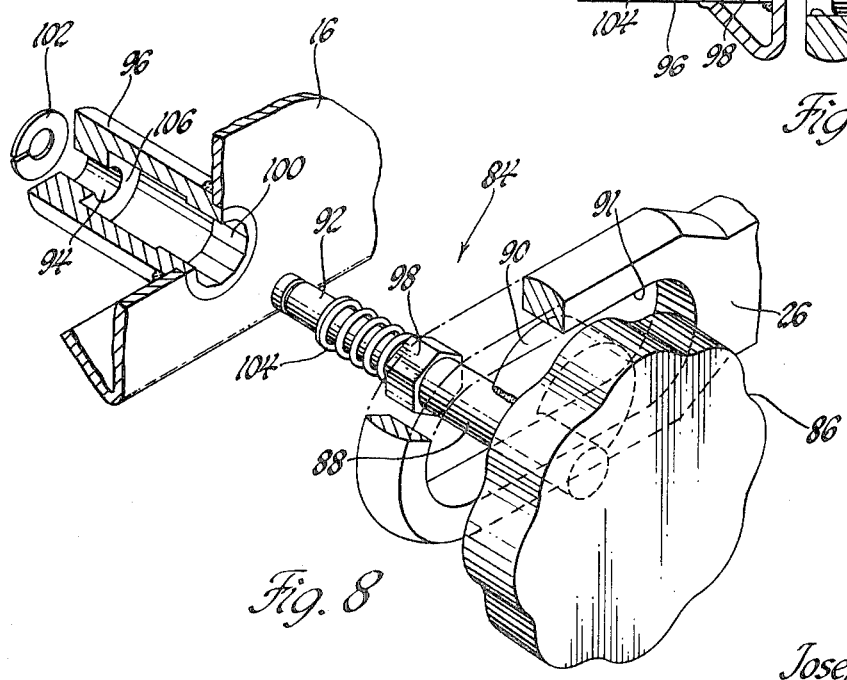
FIG. 8 is an exploded isometric view of the positioning device shown in FIGS. 6 and 7.

FIGS. 6, 7, and 8 show a modified form of the positioning device 28 for moving the lower end of the hinge arm 26 so as to realize selected positioning of the seat back frame 20 as explained in connection with the invention as shown in FIGS 1–4. The modified positioning device 84 also includes a manually rotatable knob 86 which in this case is rigidly connected to a shaft 88, the intermediate portion of which rigidly eccentrically supports a circular cam member 90 located in slot 91 formed in the hinge arm 26. Coaxially formed with the shaft and rigidly connected thereto is a pilot stud 92 which as seen in FIG. 7 is rotatably and slidably received within an end bore 94 formed in a housing 96 secured to the side rail of the seat cushion frame 16. A hexagonal locking member 98 is rigidly formed with the stud 92 and is adapted to register with a hexagonal opening 100 formed in the outboard end of the housing 96. A lock washer 102 prevents the stud 92 to be drawn out of the housing 96, while a coil spring 104 positioned between the hexagonal locking member 98 and an end wall 106 of the housing 96 biases the stud 92 as well as the knob 86 laterally outwardly relative to the housing 96. The hexagonal locking member 98 is adapted to lock the knob 86 and accordingly the cam member 90 in position when located in the hexagonal opening 100 so as to hold the hinge arm 26 from all movement other than pivotal movement about the center of the cam member 90. In order to adjust the hinge arm 26 upwardly or downwardly so as to provide selective positioning of the seat back frame 20 as described hereinbefore, the knob 86 is first moved inwardly or towards the left against the bias of spring 104, as seen in FIG. 6, so as to release the hexagonal stop member from the opening 100. Thereafter, when the knob 86 is rotated in a clockwise direction as viewed in FIG. 6, the hinge arm 26 is cammed downwardly causing the seat back frame 20 to move forwardly about the axis "B." Movement of the knob 86 in a counterclockwise direction causes the hinge arm 26 to be raised and the seat back frame 20 to be moved rearwardly about the axis "B."

I claim:

1. A seat assembly for a vehicle including a seat frame and a back frame, the latter of which is supported for selective pivotal movement relative to the seat frame about first and second transverse axes which lie in an inclined plane passing through the seat frame and intersect at a point located adjacent to the longitudinal center axis of the vehicle, a first hinge arm rigidly secured to the inboard side of said back frame for pivotally connecting the latter to the seat frame at the point of intersection of said first and second transverse axes, a second hinge arm rigidly secured to the outboard side of said back frame and having an elongated slot formed therein, a third hinge arm located on the back frame between said first and second hinge arms for pivotally connecting the rear of the back frame to the seat frame along said second transverse axis, hand-operated positioning means including a rotatable shaft located in said slot for connecting the second hinge arm to the outboard side of said seat frame along said first transverse axis and for adjustably positioning the second hinge arm about said second transverse axis whereby the back frame is movable about the latter axis to a predetermined position, and means supporting the third hinge arm an the back frame whereby said third hinge arm normally locks to a portion of the seat frame so as to define said second transverse axis and is movable relative to the back frame so as to be unlocked from the seat frame to permit movement of the back frame about said first transverse axis.

2. A seat assembly for a vehicle including a seat frame and a back frame, the latter of which is supported for selective pivotal movement relative to the seat frame about first and second transverse axes which lie in an inclined plane passing through the seat frame and intersect at a point located adjacent to the longitudinal center axis of the vehicle, a first hinge arm for pivotally connecting the inboard side of said back frame to the seat frame at said point of intersection of said first and second transverse axes, a second hinge arm carried by the outboard side of said back frame and having an elongated slot formed therein for pivotally connecting the back frame to said seat frame along said first transverse axis, a third hinge arm carried by the back frame for pivotally connecting the rear of the back frame to the seat frame along said second transverse axis, a hand-operated positioning device connecting the second hinge arm to said seat frame for adjustably positioning the second hinge arm about said second transverse axis whereby the back frame is movable about the latter axis to a predetermined position, said hand-operated positioning device comprising a pivot member rotatably mounted on said seat frame and having a laterally extending threaded stud formed therewith and located in said slot for carrying the second hinge arm and for guiding adjustable movement thereof about the second transverse axis, a knob threadably received by said stud and adapted to frictionally engage said second hinge arm to hold the latter in a fixed position relative to the stud after the second hinge arm is located in a predetermined position relative to the stud, and means supporting the third hinge arm on the back frame whereby said third hinge arm normally latches onto a portion of the seat frame so as to define said second transverse axis and is manually movable relative to the back frame so as to be unlatched from the seat frame to permit movement of the back frame about said first transverse axis.

3. The seat assembly of claim 2 wherein said second hinge arm has a plurality of locating surfaces that are conical in form and located along said slot for accommodating a portion of said knob when the latter is tightened against the second hinge arm.

4. The seat assembly of claim 3 wherein said portion of said knob is formed with a tapered surface which is adapted to seat within said locating surfaces.

5. A seat assembly mounted on a vehicle floor and including a seat frame and a back frame, the latter of which is supported for selective pivotal movement relative to the seat frame about first and second transverse axes which lie in an inclined plane passing through the seat frame and intersect at a point located adjacent to the longitudinal center axis of the vehicle, a first hinge arm for pivotally connecting the inboard side of said back frame to the seat frame at said point of intersection of said first and second transverse axes, a second hinge arm carried by the outboard side of said back frame for pivotally connecting the back frame to said seat frame along said first transverse axis, a third hinge arm carried by the back frame for pivotally connecting the rear of the back frame to the seat frame along said second transverse axis, a hand-operated positioning device connecting the second hinge arm to said seat frame for adjustably positioning the second hinge arm about said second transverse axis whereby the back frame is movable about the latter axis to a predetermined position, said hand-operated positioning device comprising a knob rigidly secured to a transverse shaft, means carried by said seat frame for supporting said shaft for axial movement along the longitudinal axis of the shaft and rotational movement about said latter-mentioned axis, a cam member eccentrically carried by said shaft, an elongated slot formed in said second hinge arm, said cam member located in said slot and engaging a portion of said hinge arm for moving the latter about said second transverse axis upon rotation of said knob, and means supporting the third hinge arm on the back frame whereby said third hinge arm normally latches onto a portion of the seat frame so as to define said second transverse axis and is manually movable relative to the back frame so as to be unlatched from the seat frame to permit movement of the back frame about said first transverse axis.

6. The seat assembly of claim 5 wherein the longitudinal axis of said slot is substantially parallel to said vehicle floor.

7. The seat assembly of claim 6 wherein said shaft includes a locking member for normally holding the knob from rotational movement.

* * * * *